United States Patent
Dobler et al.

[11] Patent Number: 6,109,783
[45] Date of Patent: Aug. 29, 2000

[54] OPTIC PYROMETER FOR GAS TURBINES

[75] Inventors: Thomas Dobler, Würenlos; Wolfgang Evers, Nussbaumen; Ken Haffner, Baden, all of Switzerland

[73] Assignee: ABB Research Ltd., Zurich, Switzerland

[21] Appl. No.: 09/137,681

[22] Filed: Aug. 21, 1998

[30] Foreign Application Priority Data

Aug. 21, 1997 [DE] Germany ............ 197 36 276

[51] Int. Cl.$^7$ .............. G01J 5/08; G01K 1/08; G01K 1/11; G01K 13/10
[52] U.S. Cl. .............. 374/131; 374/141; 374/144
[58] Field of Search .............. 374/131, 141, 374/144

[56] References Cited

U.S. PATENT DOCUMENTS

| | | | |
|---|---|---|---|
| 3,584,509 | 6/1971 | Compton et al. | 73/346 |
| 5,366,290 | 11/1994 | Mayer et al. | 374/131 |
| 5,507,576 | 4/1996 | Fally | 374/127 |
| 5,652,653 | 7/1997 | Alsmeyer et al. | 356/301 |

FOREIGN PATENT DOCUMENTS

| | | |
|---|---|---|
| 61-200437 | 9/1986 | Japan . |
| WO86/00131 | 1/1986 | WIPO . |

OTHER PUBLICATIONS

Land Application Dedicated Product: "Turbine Blade Temperature Measurement system," Land Instruments International.

Technical Specification, "Accufiber Thermometer, Model 10 High Temperature Measurement and Control System and Accessories," Luxtron Corp., copyright 1987–1991.

"Temperaturstrahlung," by W. Pepperhoff, Verlag Dr. D. Steinkopff, Darmstadt (1956) (title page only).

*Primary Examiner*—G. Bradley Bennett
*Assistant Examiner*—G. Verbitsky
*Attorney, Agent, or Firm*—Burns, Doane, Swecker & Mathis, L.L.P.

[57] ABSTRACT

The present invention discloses a high temperature pyrometer 20 which is suitable, in particular, for temperature measurement in a gas turbine. The pyrometer comprises a flexible lightguiding measuring probe 21 with a microlens 22 resistant to high temperatures and with an optic fiber 24 composed of quartz or sapphire, said microlens and said fiber being provided with a gold sheathing 25, 26 and/or a protective capillary 27, 28. The heat radiation is evaluated in a remote detector 32 having measuring electronics 33 connected to it. The pyrometer 20 is distinguished by compactness, high temperature capability, flexibility, versatile installability and high measuring accuracy. The invention also relates to a development of the pyrometer 20 for gas turbines, to a gas turbine with a pyrometer 20 according to the invention, and to a method for monitoring a gas turbine with the aid of a pyrometer 20. Explanations are given of ways in which the measuring probe 21 can be fitted in guide blades 34, 48 and by means of which accurate temperature measurements are possible on moving and guide blades 34, 35, 48, 49 in low pressure and high pressure turbines. The operating safety and the efficiency of gas turbines can thereby be increased.

14 Claims, 5 Drawing Sheets

OPTIC PYROMETER FOR GAS TURBINES

BACKGROUND OF THE INVENTION

1. Field of the Invention

The invention relates to the field of high temperature pyrometry. It proceeds from a high temperature pyrometer for temperature measurement in gas turbines, from a gas turbine with a high temperature pyrometer, and from a method for monitoring a gas turbine with the aid of a high temperature pyrometer.

2. Discussion of Background

Different methods of temperature measurement in gas turbines are known from the prior art. The fundamental physical measurement principles are based, inter alia, on the temperature dependence of an electric resistance, the Seebeck effect (thermocouple), a color reaction (thermocolor), the sound velocity in gases or the spectral distribution of scattered or emitted electromagnetic heat radiation.

Temperature sensors for gas turbines have to withstand extreme loads in respect of temperature, pressure and vibration. Conventional thermocouples age very quickly under these conditions of use. Moreover, rotating parts are also to be measured, this being possible only by means of complicated telemetry. The use of thermocolors is restricted to experimental investigations. Active laser measurement methods, such as, for example, Rayleigh scattering or CARS (Coherent Antistokes Raman Scattering), although being contactless, are complicated and difficult to implement.

It was therefore soon recognized that radiation pyrometry, as a passive optic method, is more suitable for temperature measurement in gas turbines under operating conditions. The Patent Application WO 86/00131 discloses an optic pyrometer with a viewing channel from outside the turbine as far as the first row of moving blades. The measuring apparatus is distinguished in that the pyrometer and all the optic components, including detectors, are separated from the high temperature and high pressure environment of the gas turbine by a viewing window. Viewing channels are considered to be all those connecting paths which extend in the flow duct essentially in a straight line from the first row of moving blades through a spacing between two guide blades toward the turbine casing on the combustion chamber side and which do not touch any turbine parts carrying hot gas. The viewing channel is designed to be wide enough to maintain free viewing communication, even in a thermally deformed machine, and, moreover, for different zones of the moving blades to be imaged by adjustment of the beam path within the channel. The viewing channel and viewing window are scavenged by compressed air. In a measuring setup of this type, the temperatures of guide blades, of the hot gas duct, of the burner walls or of the gas can also be measured. The main disadvantage of this pyrometer is the inherent limitation of measuring accuracy due to the enormous measuring distance of up to several meters. This is because, as a result, the area and position of the heat image to be detected can only be inadequately checked.

A related high temperature pyrometer with a viewing channel and a pressuretight viewing window is provided by Land Instruments International, Inc. under the name TBTMS (Turbine Blade Temperature Measurement System). According to FIG. 1, the viewing channel 2 terminates, outside the turbine casing 10, with a viewing window 3. There, the heat radiation is fed by optics 4 into a fiber 5 and is led by this out of the soundproofing hood (enclosure) 11. In a detector 6, the optic signal is converted into an electric signal which is supplied to measuring electronics 8 via a signal line 7. The infeed optics 4 and the connecting fiber 5 are exposed to ambient temperatures of at most 400° C. The increased risk of contamination of the optics 4 in the vicinity of the gas turbine interior has to be countered by vigorous air scavenging 9. For this purpose, the viewing channel 2 inside the turbine may have a protective tube of a length of up to 1.2 m, which consists, for example, of silicon carbide (SiC) and which withstands temperatures of up to 1550° C. and keeps away soot particles, etc.

A great disadvantage of the Land pyrometer 1 is the complexity of the optic sensor head to be mounted on the turbine casing 10. This is because said sensor head comprises an adjusting head for the optics 4 for imaging the radiation object, the pressure and temperature partitioning, including the viewing window 3, complicated air or water cooling means and the protective or viewing tube together with the scavenging system. The total weight of a sensor head of this type may greatly exceed 50 kg. Also, the viewing tube diameter of approximately 15 mm–60 mm greatly restricts the possible installation locations in gas turbines and may cause undesirable mechanical weakening of turbine parts. As will be explained in more detail later, the fact that the viewing channel 2 is linear means that this restriction leads to very flat observation angles at which the moving blades can be imaged, said angles falsifying the temperature measurement. Furthermore, at more than 1 m, the measuring distance is once again very large. The measuring spot therefore covers too large a zone of the moving blades and, under some circumstances, also part of the rotor, with the result that further measuring errors occur. Evidence of temperature errors of more than 50° C. has been found in tests with the Land pyrometer.

It is state of the art, furthermore, to equip a high temperature pyrometer with a solid optic sensor head in the form of a rigid lightguiding sapphire rod resistant to high temperatures. FIG. 2 shows a version from the Luxtron Corporation, Accufiber Division. A black cavity emitter 13 on the tip of the sapphire rod 14 serves as a measuring probe, which is held in the hot gas stream and is heated there. Once again, the heat radiation is fed outside the hot gas zone, that is to say outside the turbine casing, via an optic coupler 15, into a low temperature fiber 16, is led out from the soundproofing hood and is supplied to a detector 17 having an optic filter 18 and photodiode 19. In order to measure moving blade temperatures, the sapphire tip may also be polished flat and bent, in order to absorb the heat radiation from the desired observation object contactlessly.

The sapphire rods typically have lengths of up to 0.4 m and diameters of more than 1 mm. They become extremely hot toward the tip. Measurement values are falsified mainly due to characteristic radiation, individual absorption, radiation losses to the cooler environment and the lateral infeed of heat radiation along the freestanding sapphire rod. In the case of the closed embodiment with a cavity 13, measuring errors due to heat conduction in the sapphire rod additionally occur. In unfavorable instances, the measured temperature no longer has much in common with the hot gas or object temperature. Furthermore, in both embodiments, the flow deformation of the rods 14 above 1300° C. presents problems, and because of this flow deformation the sapphire length which can be exposed to the gas flow is limited to less than 10 mm. Watercooled carrier probes and sapphire supporting tubes are used for protection. These solutions are unsatisfactory, however, since the carrier probe disturbs the gas stream and the supporting tube is exposed to pronounced temperature gradients between the windward and the leeward sides in the gas stream and consequently to high internal stresses.

Known pyrometric signal evaluation methods, such as are specified, for example, in the manual "Temperaturstrahlung" [Thermal radiation] by W. Pepperhoff, Verlag von Dr. D. Steinkopff, Darmstadt 1956, are used to calculate the temperature from the heat radiation. In particular, the spectrum of heat radiation for determining temperatures may be evaluated in a monochromatic, bichromatic or wideband manner. Bichromatic pyrometry is useful, above all, for eliminating the influence of variable emissivity of the radiation object.

The pyrometric sensors mentioned may, in principle, be employed to determine a mean temperature of a row of moving blades or individual temperatures of the individual moving blades. The mean temperature is a useful parameter for protecting the gas turbine, for example for limiting the thermal load on the gas turbine by automatic load reduction. The individual temperatures are suitable as an early warning of overheating of the moving blades, for example on account of blocked or damaged cooling ducts.

However, in order to perform these functions, extremely stringent requirements have to be placed on the accuracy and longterm reliability of the temperature measurement. The pyrometers available at the present time do not achieve the desired measuring accuracy for the reasons mentioned. Moreover, they have a complicated design and are bulky, they require highpowered cooling systems and, overall, are difficult to integrate into gas turbines. The advantages of flexible optic transmission are fully utilized only at low temperatures. By contrast, at high temperatures, the geometry of the viewing channel or sapphire rod restricts the flexibility of the pyrometers and their adaptability to the demanding gas turbine environment.

SUMMARY OF THE INVENTION

Accordingly, one object of the invention is to provide a novel high temperature pyrometer which is distinguished by improved high temperature capability, geometric flexibility and measuring accuracy and is particularly suitable for temperature measurements in a gas turbine, a second object is to provide an improved gas turbine with a pyrometer of this type, and a third object is to provide a method for monitoring a gas turbine with the aid of a pyrometer of this type.

The essence of the invention is a lightguiding measuring probe which comprises a microoptic sensor head for detecting heat radiation and an optic fiber for transmitting the heat radiation to a detector, the sensor head and the fiber having high temperature capability and possessing a pliable sheathing resistant to high temperatures.

A first exemplary embodiment shows a measuring probe which comprises a microlens and a fiber composed of quartz glass or sapphire crystal, the microlens and fiber being provided with a high temperature coating composed of gold and/or being accommodated in a thin pliable protective capillary composed of Inconel.

A second and third exemplary embodiment represent a preferred installation of the lightguiding measuring probe in a low pressure guide blade and a high pressure guide blade.

A fourth exemplary embodiment shows an installation of the measuring probe in a guide blade, in which installation a bore with a blind hole is provided in the blade wall for receiving a sapphire fiber or quartz fiber and the blind hole acts as a microcavity or black cavity emitter.

Additional exemplary embodiments can be gathered from the rest of the claims.

One advantage of the pyrometer according to the invention is that, because of its high temperature capability and geometric flexibility, it is particularly suitable for installation in a gas turbine at hot locations where access is difficult.

Another advantage is to be seen in that the pyrometer can be mounted in the gas turbine at a short distance from the measurement object and at a favorable viewing angle, with the result that measuring accuracy is appreciably improved.

It is particularly advantageous that, with the aid of a pyrometer according to the invention, the moving blade temperatures can be checked and the gas turbine can thereby be improved in terms of temperature distribution over the circumference at the turbine inlet, operating safety, efficiency, maintenance intervals and, overall, reliability and availability.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 3:
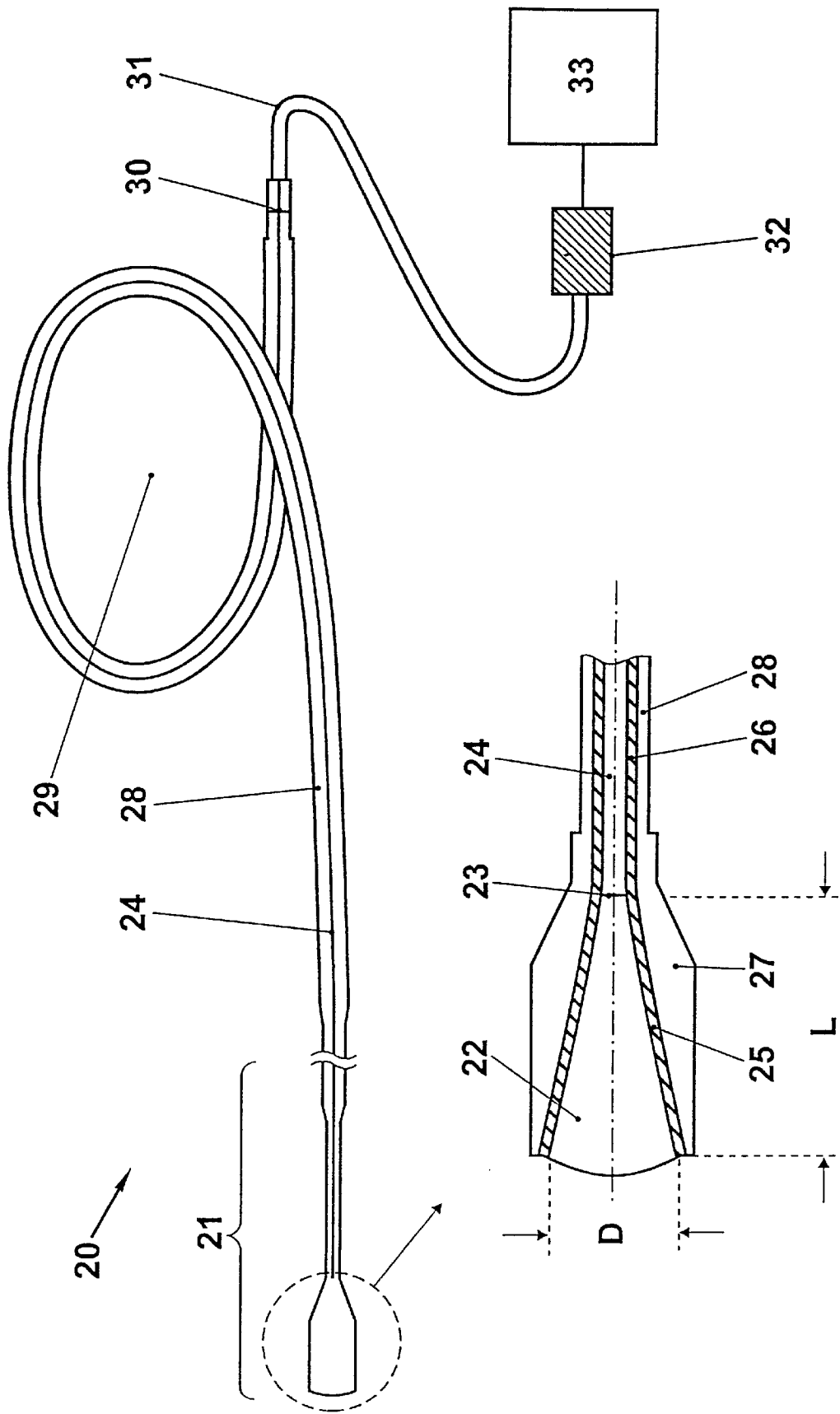
FIG. 3 shows a high temperature pyrometer according to the invention with a flexible measuring probe which is resistant to high temperatures and has a microoptic sensor head.

Referring now to the drawings, wherein like reference numerals designate identical or corresponding parts throughout the several views, FIG. 3 shows a first exemplary embodiment of a high temperature pyrometer 20 according to the invention. The pyrometric or lightguiding measuring probe 21 comprises an optic fiber 24 which has high temperature capability and a microoptic sensor head 22 having high temperature capability, said fiber and said sensor head having a pliable sheathing 25, 26, 27, 28 resistant to high temperatures. The microoptic sensor head 22 and the fiber 24 are directly connected optically to one another, that is to say there is no need for any infeed optics in order to transmit light from the sensor head 22 into the fiber 24. Heat radiation from a measurement object is detected by the sensor head 22, fed into the fiber 24, transmitted to a detector 32 and converted into at least one electric signal. From the latter, a temperature signal characteristic of the temperature of the measurement object is calculated in measuring electronics 33 with the aid-of known pyrometric signal evaluation methods.

In the simplest instance, the microoptic sensor head 22 comprises of one end of the fiber 24, which end may, for example, be polished flat. In order to enlarge the reception area, it is advantageous if the sensor head 22 is a cone (taper)

22. It is particularly beneficial if, as illustrated, the cone 22 is a microlens 22 with a convex, for example spherical, front face. The cone 22 has, for example, a maximum diameter D=1 mm–2 mm and a length L=3–6 mm. For an efficient feed of light into the fiber 24, the cone 22 should taper to the fiber diameter. It is also conceivable to lengthen the sensor head 22 toward the fiber 24 by means of a short rodlike light guide, as long as the flexibility and installability of the measuring probe 21 as a whole are not impaired thereby.

The microlens 22 restricts the numeric aperture or the optic aperture angle of the measuring probe 21, and, due to this constriction of the viewing field, less interfering radiation is received. Moreover, because of the refractive power of the microlens 22, the total heat radiation coming from a measurement object and impinging on the reception area can be fed efficiently into the fiber 24. In particular, for a desired size of the measuring spot and a predetermined object distance range, the focal length of the microlens 22 and the cone length L can be optimized, for example by means of a ray tracing program. Finally, it is important for the sensor head 22 and the fiber 24 to be designed in one piece or to be optically connected to one another in a manner resistant to high temperatures.

The fiber 24 and the sensor head 22 must consist of a heat resistant material which is transparent for the desired spectral range. A suitable choice is silicate glass or quartz glass with a use temperature of up to 1100° C. and with a typical transmission range of 0.3 $\mu$m–2 $\mu$m. In particular, a standard all-silica glass fiber with a core and envelope (cladding) composed of quartz glass is suitable as a high temperature fiber 24. Preferably, the glass fiber 24 is selected to be multimodal with a stepped index profile and with a core diameter of less than 400 $\mu$m. A onepiece version of the cone 22 and fiber 24 can be produced in a known way, for example, from a fiber end by heating and compression or heating and drop formation or, in the case of the production of the fiber 24, by using the cone 22 as a nucleus or by varying the melting speed (feed rate) and drawing speed (pull rate). If necessary, the convex front face may be produced by polishing the cone 22, by laser melting and resolidification of the front face under the action of surface tension or the like. Alternatively to this, the cone 22 or the microlens 22 may be prefabricated, in particular polished, from quartz glass and connected to the fiber 24 via a splice 23, that is to say by electric arc fusion. A laser melting method, glass solder or the like may also be used as an alternative optic connecting technique resistant to high temperatures.

Another advantageous choice of material for the sensor head 22 and the fiber 24 is sapphire crystal with a use temperature of up to approximately 1900° C. and with a typical transmission range of 0.2 $\mu$m–5 $\mu$m. Moreover, due to its chemical inertia, sapphire is distinguished by outstanding longterm resistance, even at high temperatures and in a corrosive environment. It is nowadays possible to obtain pliable monocrystalline sapphire fibers with a diameter of, for example, 300 $\mu$m and a length of up to a few meters. The high temperature fiber 24 may be completely or partially such a sapphire fiber. A onepiece version of the cone 22 or microlens 22 and the sapphire fiber 24 is obtained, in principle, by means of the methods known from quartz. The cone 22 or the microlens 22 may also be bred directly from sapphire crystal and machined by polishing, laser melting, etc. and optically connected to a sapphire fiber 24, for example via glass solder, in a manner resistant to high temperatures. Sapphire may also be optically connected to quartz, in particular a sapphire sensor head 22 to a quartz fiber 24, by means of glass solder.

In practice, a measuring probe 21 designed in this way should be protected from corrosion, moisture, mechanical damage, etc. In particular, a quartz fiber 24 and/or a quartz sensor head 22 is exposed to pronounced corrosion at high temperatures and in a chemically aggressive environment and requires a chemically inert high temperature coating 25, 26 of good adhesion, which may consist of a metal. Gold is particularly advantageous up to 750° C. and aluminum up to 550° C. Inward diffusion is too great above these temperatures. It is known to provide quartz fibers 24 with such a coating or with a sheath 26. According to the invention, the sensor head 22 is sheathed with solder 25, a gold or aluminum primer being sputtered on for better adhesion of the solder 25.

The mechanical protective action of the high temperature coating 25, 26 is somewhat slight. According to the invention, much improved mechanical protection is achieved by means of a protective capillary 27, 28 which preferably consists of a metal, in particular of a heat resistant and corrosion resistant alloy, such as, for example, Inconel. The protective capillary 27, 28 is in the form of a small thin tube which, for better pliability, may have a stepped taper toward the sensor head 22. The sensor head 22 itself may likewise be surrounded by the protective capillary 27, 28, in particular by a head part 27. The head part 27 is fastened to the sensor head 22 via the solder 25, by means of a ceramic high temperature adhesive, by crimping or the like.

In the case of a sapphire fiber 24 and/or a sapphire sensor head 22, it is necessary to ensure mechanical protection without compromising light guidance. Here too a high temperature coating 25, 26 is likewise possible, particularly since gold and aluminum have high reflectivity in the infrared spectral range. Moreover, sapphire fibers with cladding are also to be expected in future. Once again, a protective capillary 27, 28 is provided instead of, or in addition to, the high temperature coating 25, 26.

Overall, the possibility of using the measuring probe 21 in difficult measuring environments is markedly improved by the sheathing 25, 26, 27, 28 according to the invention, in particular the high temperature coating 25, 26 and/or the protective capillary 27, 28. It is essential here for the high temperature coating 25, 26 and the protective capillary 27, 28 to be mechanically flexible, in order to preserve the benefits of the pliability of the measuring probe 21. Furthermore, for long fibers 24, a compensating loop 29 is provided in order to compensate the different coefficients of thermal expansion of the fiber 24 and capillary 28. The distance to the detector 32 may be bridged by a conventional lengthening fiber 31 and provided with optic connectors 30.

Figure 1:
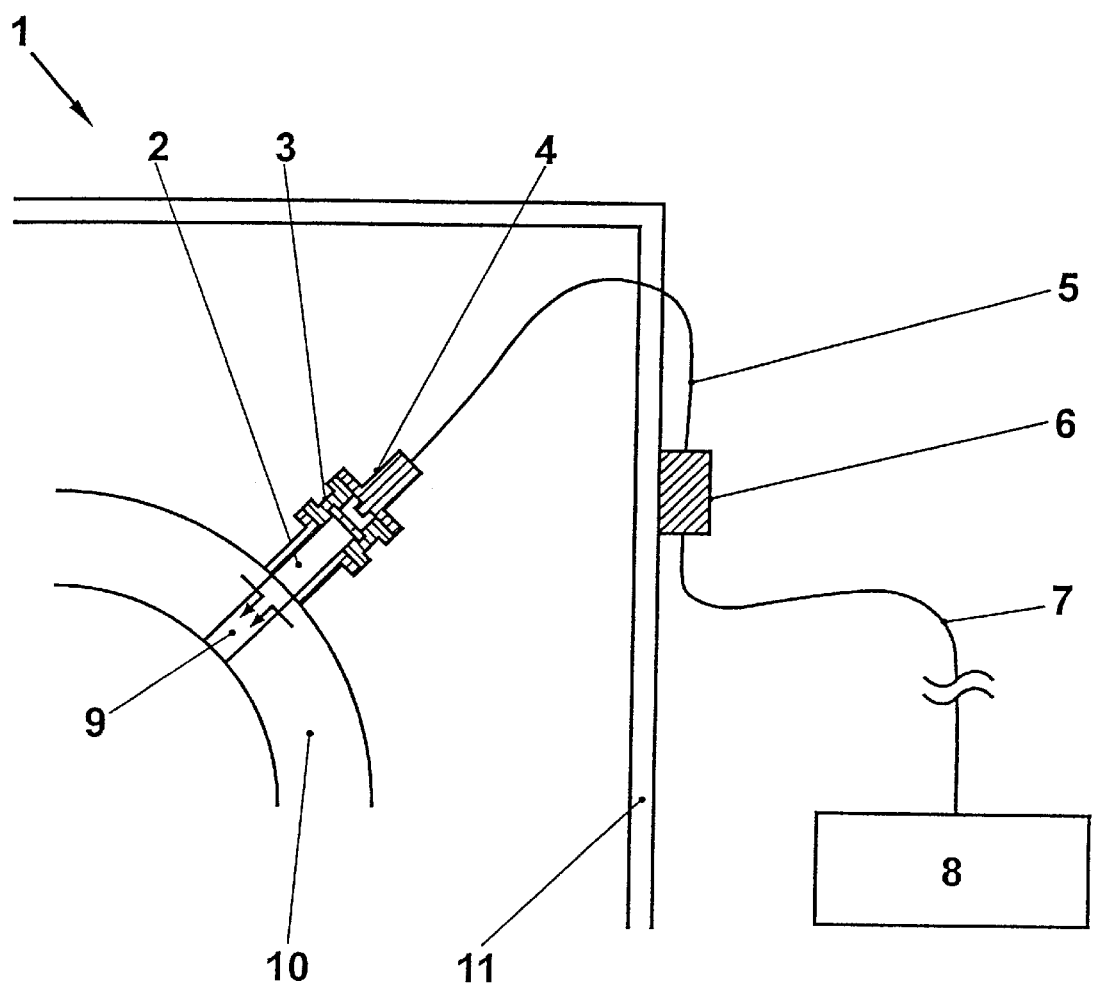
FIG. 1 shows a high temperature pyrometer with a viewing channel from Land Instruments International, Inc. (prior art)
Figure 2:
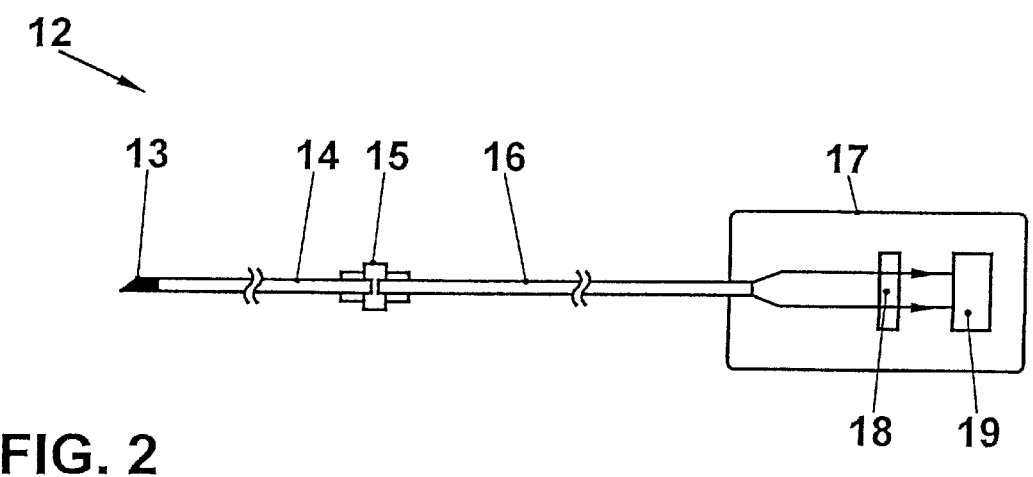
FIG. 2 shows a high temperature pyrometer with a sapphire rod from Luxtron Corporation, Accufiber Division (prior art)

The high temperature pyrometer according to the invention has significant advantages, as compared with the known prior art. The lightguiding measuring probe 21 makes a rigid straight viewing channel 2 or sapphire rod 14 according to FIG. 1 or FIG. 2 superfluous. The infeed optics 4, 15 for the low temperature fiber 5, 16 as well as the pressuretight viewing window 3, together with the complicated cooling means and air scavenging system 9 and the heavy mounting flanges, are likewise dispense with at the interface between the high temperature and low temperature regions of the gas turbine. Instead, the lightguiding measuring probe 21 is distinguished by compactness, high temperature resistance of the components and design, and simple protectability against mechanical and corrosive influences, fiberoptic flexibility being maintained at the same time. The measuring probe 21 is also pliable within narrow radii of up to a few cm and can therefore be installed in machines at many locations, even ones where access is difficult. Even extremely hot measurement objects can be observed by means of the microoptic sensor 22 from close proximity and with high local resolution. The versatility of the measuring probe 21 according to the invention is also evident from the fact that the detector 32 and the measuring electronics 33 can also supply a spectrometric evaluation of the heat radiation. Falsifications of the spectrum due to nonuniform spectral transmission from the pyrometer 20 can be gauged and corrected. The spectrum can, for example, give information on the nature of the surface of the measurement object.

The optic high temperature pyrometer 20 is particularly suitable for determining radiation temperatures in a gas turbine. For such a development or use, the measuring probe 21 is arranged in the interior of the gas turbine in order to detect the heat radiation from structural parts subjected to high thermal load, a fiber 24, 31 for transmitting the heat radiation to a detector 32 is provided, preferably outside the gas turbine, and the detector 32 is connected to the measuring electronics 33.

A particularly useful development or use of the pyrometer 20 concerns accurate interference-insensitive temperature measurement on rotating or stationary turbine blades. For this purpose, the measuring probe 21 is seated in a bore 41 in a guide blade 34, 48 preferably of the first or second row. The fiber 24, 31, in particular, in the hot gas zone, the high temperature fiber 24, lies at least partially in a cooling duct of the gas turbine. Moreover, a guide tube 43 for receiving the fiber 24, 31 and/or the measuring probe 21 is provided. Three preferred embodiments of a pyrometer 20 of this type are illustrated in detail in FIGS. 4 to 6.

Figure 4:
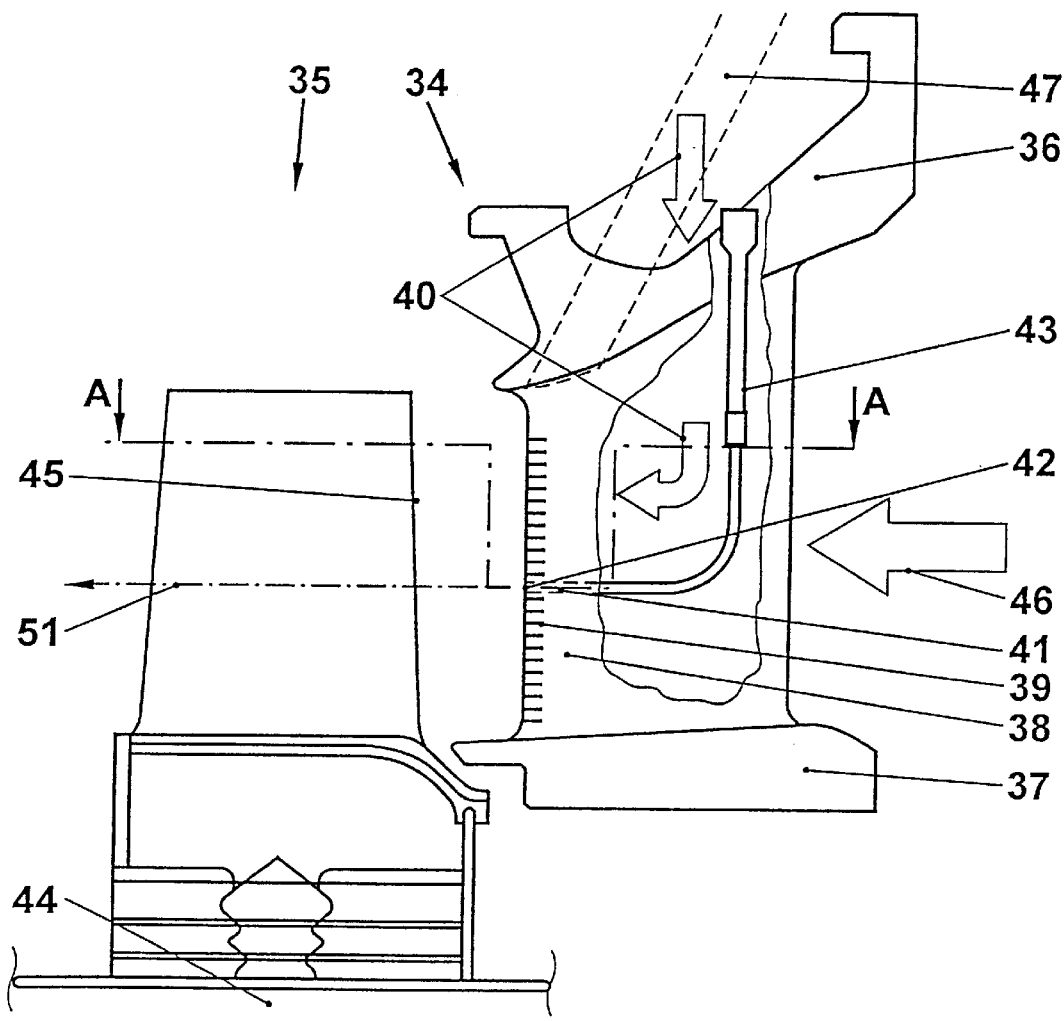
FIG. 4 shows an installation of a pyrometer according to FIG. 3 in a low pressure moving blade.
Figure 4:
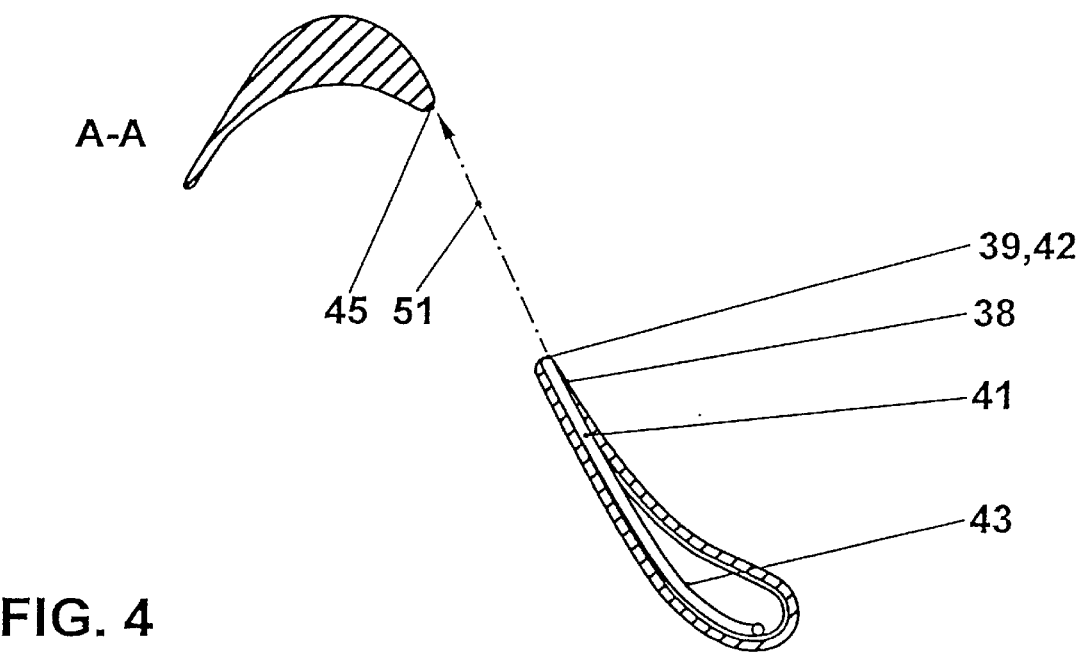

FIG. 4 shows a guide blade 34 and a moving blade 35 preferably of the first or second row of a low pressure gas turbine in a side view and in profile along the section A—A. The guide blade 34 is fixed between the blade foot 36 and blade platform 37 and guides the hot gas flow 46 onto the moving blade 35, which is fastened to the rotor 44. In the guide blade 34, blade cooling ducts 39, which are supplied with cooling air 40 from the gas turbine cooling ducts (not illustrated), extend between the blade foot 36 and trailing edge 38. A bore 41 is made, in particular cast or eroded, in the guide blade 34, said bore having an orifice 42 on a trailing edge 38 of the guide blade 34. The sensor head 22 is arranged in the orifice 42 with the viewing direction toward a moving blade 35, in particular toward a leading edge 45 of a moving blade 35.

The bore 41 preferably runs along the blade cooling ducts 39 and has a guide tube 43 for receiving the measuring probe 21. The guide tube 43 has, at the end, a stop which ensures that the sensor head 22 is positioned correctly in the guide blade 34, cooling air 40 flowing through said guide tube. Moreover, holes for the cooling air 40 may be provided in the guide tube 43 for even more efficient cooling of the measuring probe 21 and, at the same time, scavenging of the sensor head 22. Different gas turbine walls or gas turbine plenums having different pressure levels can be penetrated in a simple way by the guide tube 43 or its extension (not illustrated) for receiving the fiber 24, 31 and by pressuretight leadthroughs. A seal between the guide tube 43 and the protective capillary 28 is provided at the end of the guide tube 43. The measuring probe 21 can easily, due to its flexibility and stability, be pushed even into bent guide tubes 43 by distances of up to approximately 6 m.

In a pyrometer setup of this type, the abovementioned advantages are brought fully to fruition, as compared with the prior art. The diameter of the measuring probe 21, even with the protective capillary 27, 28, is less than 2 mm and, with the guide tube 43, is 2.5 mm, in contrast to up to 60 mm for a viewing channel 47, indicated by broken lines, for a conventional pyrometer 1. Only in this way is it possible to install the high temperature pyrometer 20 according to the invention in a guide blade 34 without any harmful mechanical weakening and to lay the measuring probe 21 in the cooling system of the gas turbine as far as the high temperature zone. Cooling thus takes place without any additional outlay and appreciably increases the life of the pyrometer 20. Furthermore, the pyrometer 20 can be exchanged in a simple way, even while the gas turbine is in operation.

The advantages in terms of measuring accuracy are also significant. By installing the measuring probe 21 in a cooled guide blade 34 of a temperature of approximately 600° C., with the surface temperature of the moving blade 35 to be measured being approximately 700° C.–1000° C., the problems due to characteristic radiation and individual absorption of the sensor head 22 and of the high temperature coating 25, 26 composed of gold or the like are largely forced into the background. The small area of the microlens 22 and its positioning between the blade cooling ducts 39 ensure highly efficient scavenging and keeping clean by the cooling air 40. The measuring spot and the distance to the measurement object are very small or even minimal. As a result, disturbances caused by diffusely reflected extraneous radiation from adjacent blades, blade feet 36, the rotor 44, the casing surrounding of the hot gas duct, etc. are reduced. Finally, high local resolution of the temperature measurement on the rotating moving blade 35 is achieved by means of the small measuring spot in combination with quick-acting measuring electronics 33. The necessary bandwidth of 100 kHz–1 MHz can be achieved by means of InGaAs photodiodes and quick-acting DSP processors. In such a configuration, it is possible for individual temperature profiles of all the moving blades 35 to be of the first row to be recorded, hot moving blades 35 to be identified and temperature maxima within individual moving blades 35 to be detected.

It is also advantageous that the viewing direction from the guide blade trailing edge 38 to the moving blade leading edge 45 is essentially perpendicular to the heat-radiating surface observed. This is because, for real nondiffusely scattering surfaces, the angular distribution of the emitted radiation may diverge sharply from Lambert's cosine law and, in particular, fall sharply in a critical angle range above 30°. This behavior is evident, for example, from the manual by R. Siegel and John R. Howell entitled "Thermal Radiation Heat Transfer", Hemisphere Publishing Corporation, Washington (see, for example, page 178). The critical angle range often occurs, in practice, between 60° and 80° and falsifies the temperature measurement due to the variability or indeterminacy of emissivity. By means of the pyrometer 20 according to the invention, however, measurement can be carried out as long as the viewing direction is within a cone having an aperture angle of approximately 30° from the perpendicular to the surface of the observed zone of the moving blade 35. In contrast to this, with a conventional viewing channel 47, the viewing angle amounts to 60° and above, which may result in considerable measuring errors.

Figure 5:
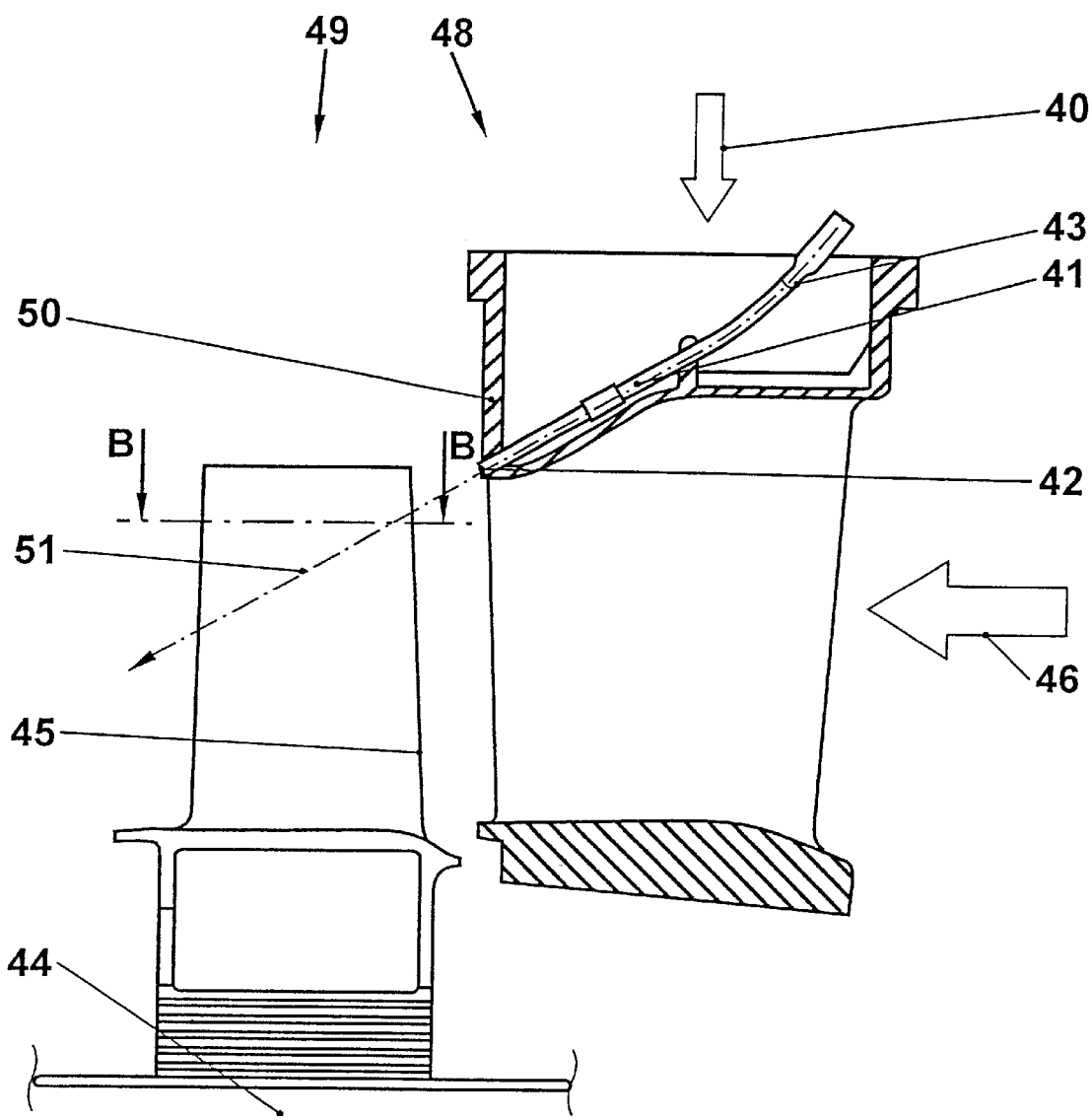
FIG. 5 shows an installation of a pyrometer according to FIG. 3 in a high pressure moving blade.
Figure 5:
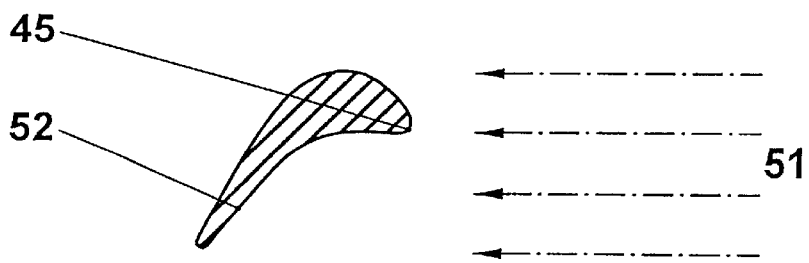

FIG. 5 shows a guide blade 48 and a moving blade 49 preferably of the first or second row of a high pressure gas turbine in a side view and shows a moving blade 49 in profile along the section B—B. On account of the cooling structures of the guide blade 48, it is impossible to install a viewing channel for a conventional pyrometer 1. However, a high temperature pyrometer 20 according to the invention can be integrated in the blade foot 37. Once again, a bore 41 is provided in a guide blade 48, said bore having an orifice 42 on a rear wall 50 of the blade foot 36 of the guide blade 48. The sensor head 22 is arranged in the orifice 42 with the viewing direction toward the moving blade 49. The statements made as regards FIG. 4 in respect of the bore 41, the guide tube 43, the measuring probe 21, the protective capillary 27, 28, etc. and the advantages apply equally or correspondingly here. The angle of inclination of the bore 41 relative to the hot gas flow direction 46 is still small at approximately 30°, so that the viewing direction 51 of the measuring probe 21 forms small angles to the perpendicular to the surface of the moving blade 49. As illustrated in profile, when the rotor rotates the measuring probe 21 sweeps over a large part of the moving blade 49, in particular the leading edge 45 and the pressure side 52 in the region of the trailing edge. The high pressure moving blade 49 can thereby be monitored very accurately with regard to hot zones.

Figure 6:
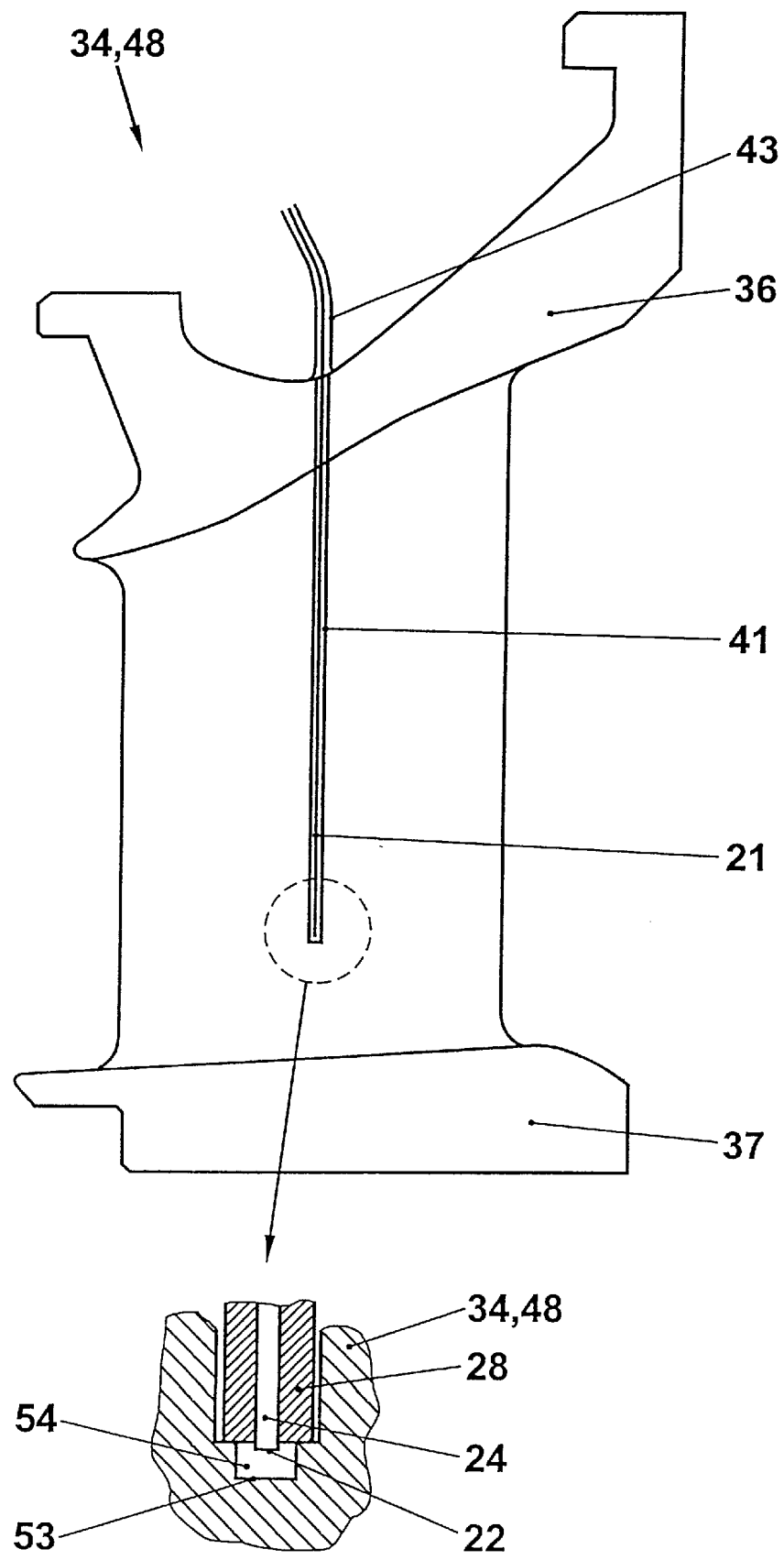
FIG. 6 shows an installation of a pyrometer according to FIG. 3 with a microcavity in a guide blade.

FIG. 6 shows an embodiment of a high temperature pyrometer 20 for measuring the surface temperature of a guide blade 34, 48. The bore 41 is located in a wall of the guide blade 34, 38 as near as possible to the surface where it is made, in particular eroded in, and has a blind hole 53 with a spacer for the sensor head 22. The sensor head 22 forms, with the blind hole 53 of the bore 41, a microcavity 54, which acts as a black cavity emitter. The measuring probe 21 and the sensor head 22 are, once again, designed as described with regard to FIG. 3. The measuring probe 21 preferably comprises a thin monocrystalline sapphire fiber 24 with a very thin protective capillary 28. A bore 41 with a diameter of approximately 0.8 mm, and possibly a length of, for example, 100 mm, is then sufficient. A guide tube 43 is provided only outside the bore 41. In principle, it is conceivable for the bore 41 to run at an angle or arcuately. The spacer may be, for example, a steplike shoulder, a taper of the bore 41, a sleeve or the like. It ensures that a fixed distance of approximately 4–6 mm is maintained between the sensor head 22 and the end of the bore 41. The dimensions and design of the microcavity 54 may well differ from the information given. All that is necessary for accurate temperature measurement is that the walls of the microcavity 54 are at the temperature to be measured, that is to say, in this case, at least approximately at the surface temperature of a guide blade 34, 48, and that the size and therefore the emissivity of the microcavity 54 are kept constant.

This pyrometer setup provides an almost ideal black cavity emitter for a near-surface temperature of the guide blade 34, 48. A pyrometer 20 designed in this way is distinguished by the advantages mentioned earlier. Furthermore, it is superior to the currently employed high temperature thermocouples in terms of lifetime, signal strength and measuring accuracy. For example, aging effects are low, even at high wall temperatures of approximately 950° C., the signal strength or light energy of the heat radiation increases sharply with the temperature and, by virtue of the contactless measurement method, measuring errors due to heat conduction in the sensor and to very high temperature gradients in the blade wall of up to 300° C./mm are eliminated.

The pyrometer 20 according to the invention is also suitable for measuring temperatures of other structural parts of a gas turbine, such as, for example, the rotor 44 or the casing surroundings, or for measuring gas temperatures and for measuring temperatures in a gas turbine drive unit. The embodiments and installation variants disclosed here can be adapted accordingly for these uses. For simultaneous temperature measurement at various locations in a gas turbine, a plurality of pyrometers 20 may also be installed and their heat radiation signals evaluated by common measuring electronics 33. Spectrometric recording of the surface nature is also possible in each case, in addition to or instead of pyrometric temperature determination.

The subject of the invention is, furthermore, a gas turbine which is suitable, in particular, for generating electric energy and which has a high temperature pyrometer 20 according to the invention, by which the measuring probe 21 for detecting heat radiation from structural parts subjected to high thermal load is arranged in the interior of the gas turbine, of which the fiber 24, 31 is provided for transmitting the heat radiation to a detector 32 and the detector 32 of which is connected to measuring electronics 33. The detector 32 is preferably arranged outside the gas turbine.

An advantageous embodiment relates to a gas turbine with a guide blade 34, 38 having a bore 41 for receiving the measuring probe 21, with a cooling duct which serves for at least partially receiving the fiber 24, 31, and with a guide tube 43 for receiving the fiber 24, 31 and/or the measuring probe 21. In particular, the bore 41 has an orifice 42 on a trailing edge 38 of the guide blade 34 or on a rear wall 50 of a blade foot 36 of the guide blade 48, and the sensor head 22 is arranged in the orifice 42 with the viewing direction toward a moving blade 35, 49. Alternatively to this, the bore 41 may be located in a wall of the guide blade 34, 48 as near as possible to the surface and may have a blind hole 53, in which a spacer for the sensor head 22 is arranged in such a way that the sensor head 22 forms, with the blind hole 53, a microcavity 54.

The invention also relates to a method for monitoring a gas turbine with the aid of a high temperature pyrometer 20 according to the invention. A precondition is that, as before, the measuring probe 21 is arranged in the interior of the gas turbine in order to detect the heat radiation from structural parts subject to high thermal load, a fiber 24, 31 for transmitting the heat radiation to a detector 32 is provided preferably outside the gas turbine, and the detector 32 is connected to measuring electronics 33. A characteristic temperature signal is of at least one structural part subjected to high thermal load is then calculated in the measuring electronics 33 and the temperature signal is used as a protective signal for monitoring the gas turbine. Monitoring involves a check of thermal overstressing of the structural part, if required load reduction by throttling the fuel supply, or recording the thermal load history of the structural part in order to estimate its presumed lifetime.

The monitoring of the temperatures of the moving blades 35, 49 and guide blades 34, 48 particularly of the first and second row is especially important. The blades 34, 35, 48, 49 are subjected to such high thermal load that their life may be markedly reduced even by relatively moderate excess temperatures of a few 10° C. The risk of such excess temperatures is considerable, however, due to the large temperature difference of a few hundred ° C. between the hot gas and the cooled blades 34, 35, 48, 49. Moreover, individual blades 34, 35, 48, 49 may be overheated because of defects. The pyrometer 20 according to the invention, by virtue of its improved measuring accuracy, is highly suitable for protecting against this. In particular, the pyrometer 20 is first calibrated by a comparison measurement by means of a perfect black emitter. Absolute temperature measurements at 1000° C, with a measuring accuracy better than ±10° C., can then be achieved. This means that excess temperatures of blades 34, 35, 48, 49 can be measured with sufficient accuracy and reliability for the first time. A mean temperature signal and/or individual temperature signals from moving blades 35, 49 or guide blades 34, 48, in particular a row of moving blades 35, 49 or guide blades 34, 48, is/are preferably used as characteristic temperature signal. Furthermore, the pyrometer 20 is also a valuable aid in bringing the blade temperatures nearer to the load limit in a controlled manner during operation and thereby increasing the efficiency of the gas turbine.

Overall, the invention discloses a compact, flexible high temperature pyrometer 20 which is resistant to high temperatures and is intended for installation in hot environments where access is difficult, said pyrometer being particularly useful, on account of its high measuring accuracy, for the protection and increase in output of turbines.

Obviously numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A high temperature pyrometer suitable for temperature measurement in a gas turbine, the pyrometer comprising a lightguiding measuring probe for detecting heat radiation and transmitting the latter to a detector, wherein
   the measuring probe comprises an optic fiber with a microoptic sensor head;
   the fiber and the sensor head are resistant to high temperatures; and
   the fiber and the sensor head have a pliable sheathing resistant to high temperatures.

2. The high temperature pyrometer as claimed in claim 1, wherein
   the sensor head comprises a cone or a microlens; and
   the sensor head and the fiber are designed in one piece or are optically connected to one another in a manner resistant to high temperatures.

3. The high temperature pyrometer as claimed in claim 1, wherein
   the fiber and the sensor head each comprises an external element selected from the group consisting of a high temperature coating and a protective capillary.

4. The high temperature pyrometer as claimed in claim 3, wherein
   the fiber and the sensor head comprise a material selected from the group consisting of quartz glass and sapphire crystal;
   the high temperature coating comprises a metal selected from the group consisting of gold and aluminum; and
   the protective capillary comprises Inconel.

5. The high temperature pyrometer as claimed in claim 1, further in combination with a gas turbine having structural parts subject to high thermal load, wherein the measuring probe is arranged in the interior of the gas turbine in order to detect the heat radiation from said structural parts, and further comprising:
   a detector;
   a fiber for transmitting the heat radiation to the detector;
   measuring electronics, the detector being connected to the measuring electronics; and
   the detector being positioned outside the gas turbine.

6. The high temperature pyrometer as claimed in claim 5, wherein
   the turbine includes a cooling duct and a guide blade having a trailing edge, a foot with a rear wall, and a bore therein;
   the measuring probe is seated in the bore in the guide blade;
   the fiber is located at least partially in the cooling duct; and
   further comprising a guide tube receiving an element of the pyrometer selected from the group consisting of the fiber and the measuring probe.

7. The high temperature pyrometer as claimed in claim 6, wherein the gas turbine includes a moving blade, and wherein
   the bore has an orifice (42) on one of the guide blade trailing edge or the blade foot rear wall; and
   the sensor head is positioned in the orifice and includes a viewing direction toward the moving blade.

8. The high temperature pyrometer as claimed in claim 6, wherein
   the bore is located in a wall of the guide blade proximate the surface and has a blind hole;
   further comprising a spacer for the sensor head in the blind hole; and
   the sensor head and the blind hole together form a cavity.

9. A gas turbine suitable for generating electric energy, in combination with a high temperature pyrometer as claimed in claim 1, wherein
   the gas turbine includes structural parts subject to high thermal load;
   the measuring probe is arranged in the interior of the gas turbine;
   a detector;
   measuring electronics in communication with the detector;
   the optic fiber is in communication with the detector for transmitting the heat radiation to the detector; and
   the detector is positioned outside the gas turbine.

10. The gas turbine as claimed in claim 9, wherein the gas turbine further comprises
    a guide blade including a bore for receiving the measuring probe;
    a cooling duct at least partially receiving the optic fiber; and
    a guide tube receiving an element selected from the group consisting of the optic fiber and the measuring probe.

11. The gas turbine as claimed in claim 10, wherein the gas turbine further comprises a moving blade and guide blade having a trailing edge and a blade foot having a rear wall, and wherein
    the bore has an orifice on at least one of the trailing edge and the blade foot rear wall; and
    the sensor head is positioned in the orifice and includes a viewing direction toward the moving blade.

12. The gas turbine as claimed in claim 10, wherein the bore is located in a wall of the guide blade proximate the surface and has a blind hole;
    further comprising a spacer for the sensor head in the blind hole; and
    the sensor head and the blind hole together form a cavity.

13. A method for monitoring a gas turbine using a high temperature pyrometer as claimed in claim 5, wherein
    calculating a characteristic temperature signal of at least one structural part subject to high thermal load is with the measuring electronics; and
    monitoring a temperature signal as a protective signal for monitoring the gas turbine.

14. A method for monitoring a gas turbine as claimed in claim 13, wherein
    the step of calculating comprises calculating a characteristic temperature signal of a structural part comprising a row of moving blades or guide blades; and
    determining a mean temperature signal, individual temperature signals, or both from the moving blades or guide blades as characteristic temperature signal.

* * * * *